United States Patent
Beelitz

(10) Patent No.: US 6,298,427 B1
(45) Date of Patent: *Oct. 2, 2001

(54) METHOD AND APPARATUS FOR MAPPING HARD DISK PARTITIONS AND BLOCK DEVICES TO LOGICAL DRIVES IN A COMPUTER SYSTEM

(75) Inventor: Alan E. Beelitz, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/237,413

(22) Filed: Jan. 26, 1999

(51) Int. Cl.[7] ................................................. G06F 12/00
(52) U.S. Cl. ........................ 711/173; 711/170; 711/171; 711/172; 711/111; 711/112; 711/113
(58) Field of Search .................. 711/100–104, 170–173, 711/111–119; 713/1, 100

(56) References Cited

U.S. PATENT DOCUMENTS

| | | | |
|---|---|---|---|
| 5,293,631 | 3/1994 | Rau et al. | 395/707 |
| 5,321,836 | 6/1994 | Crawford et al. | 711/206 |
| 5,671,229 | 9/1997 | Harari et al. | 714/710 |
| 5,682,529 | 10/1997 | Hendry et al. | 713/100 |
| 5,715,418 | 2/1998 | Atsatt et al. | 711/202 |
| 5,719,808 | 2/1998 | Harari et al. | 365/185.33 |
| 5,754,817 | 5/1998 | Wells et al. | 711/203 |
| 5,819,087 | 10/1998 | Le et al. | 713/2 |
| 5,944,820 | * 8/1999 | Beelitz | 713/1 |
| 5,974,517 | * 10/1999 | Gaudet | 711/173 |
| 6,029,237 | * 2/2000 | Beelitz | 711/173 |
| 6,032,223 | * 2/2000 | Beelitz | 711/104 |
| 6,032,239 | * 2/2000 | Beelitz | 711/173 |
| 6,041,395 | * 3/2000 | Beelitz | 711/173 |

* cited by examiner

Primary Examiner—Than Nguyen
(74) Attorney, Agent, or Firm—Haynes and Boone, L.L.P.

(57) ABSTRACT

A computer system includes at least one processor and at least one computer-readable drive. The at least one computer-readable drive includes at least one partition. The computer system further includes manufacturing process code having instructions for causing the processor to build prescribed internal data structures necessary to support the at least one partition subsequent an initial preparation of the at least one computer-readable drive, further without requiring a system reboot to have access to the at least one computer-readable drive.

8 Claims, 1 Drawing Sheet

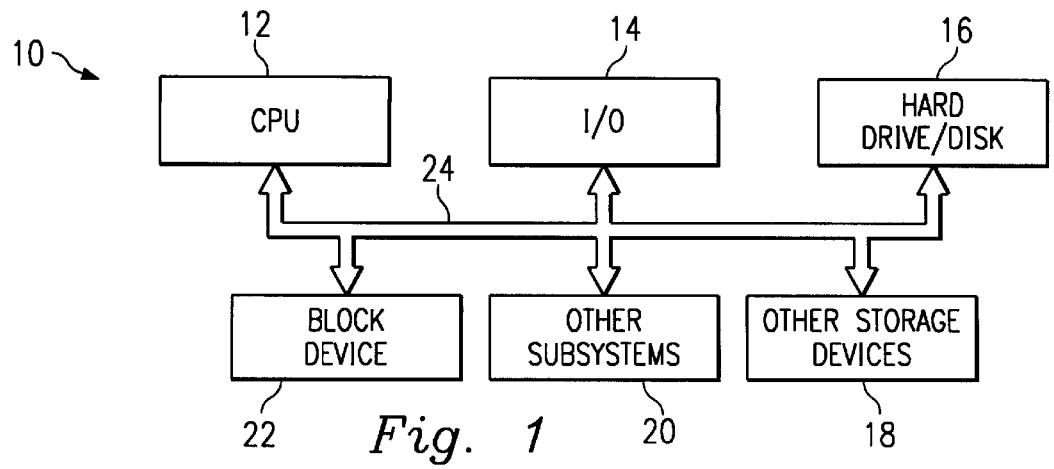
Fig. 1
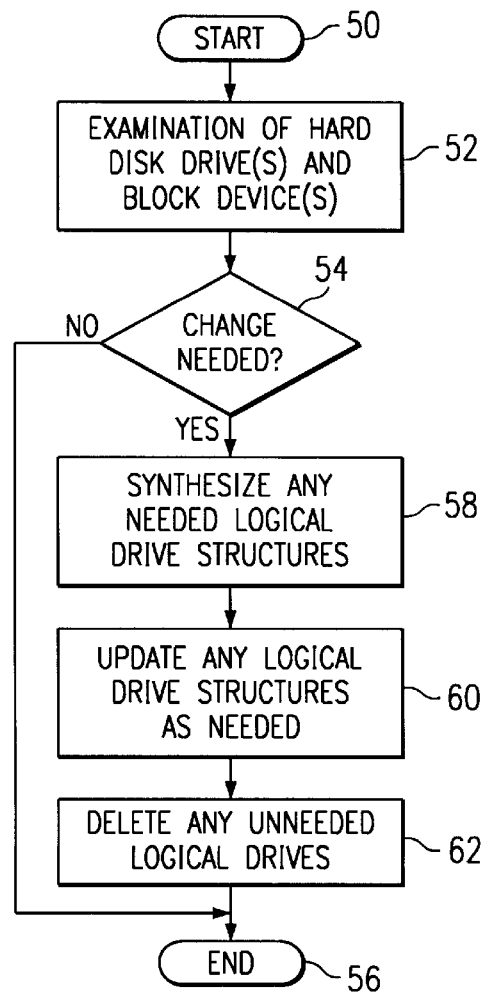
Fig. 2
Fig. 3

METHOD AND APPARATUS FOR MAPPING HARD DISK PARTITIONS AND BLOCK DEVICES TO LOGICAL DRIVES IN A COMPUTER SYSTEM

BACKGROUND

The present invention relates generally to building computer systems and more particularly to the preparation of build-to-order computer systems.

This application relates to co-pending U.S. patent application Ser. No. 08/951,135, filed on Oct. 15, 1997, now U.S. Pat. No. 5,944,820, entitled "Modifiable Partition Boot Record for a Computer Memory Device", naming Alan Beelitz as inventor. The co-pending application is incorporated herein by reference in its entirety, and is assigned to the assignee of the present invention.

This application relates to co-pending U.S. patent application Ser. No. 08/984,386, filed on Dec. 3, 1997, now U.S. Pat. No. 6,041,395, entitled "System and Method for Changing Partition Mappings to Logical Drives in a Computer Memory", naming Alan Beelitz as inventor. The co-pending application is incorporated herein by reference in its entirety, and is assigned to the assignee of the present invention.

This application relates to co-pending U.S. patent application Ser. No. 08/950,545, filed on Oct. 15, 1997, now U.S. Pat. No. 6,032,239, entitled "System and Method for Updating Partition Mappings to Logical Drives in a Computer Memory Device", naming Alan Beelitz as inventor. The co-pending application is incorporated herein by reference in its entirety, and is assigned to the assignee of the present invention.

This application relates to co-pending U.S. patent application Ser. No. 08/947,138, filed on Oct. 8, 1997, now U.S. Pat. No. 6,029,237, entitled "Method for Simulating a Computer Storage Device", naming Alan Beelitz as inventor. The co-pending application is incorporated herein by reference in its entirety, and is assigned to the assignee of the present invention.

This application relates to co-pending U.S. patent application Ser. No. 08/951,137, filed on Oct. 15, 1997, now U.S. Pat. No. 6,032,223, entitled "System and Method for Utilizing a RAM Disk", naming Alan Beelitz as inventor. The co-pending application is incorporated herein by reference in its entirety, and is assigned to the assignee of the present invention.

This application relates to co-pending U.S. patent application Ser. No. 09/012,196, filed on Jan. 23, 1998, entitled "System and Method for Preparing a Computer Memory", naming Alan Beelitz as inventor. The co-pending application is incorporated herein by reference in its entirety, and is assigned to the assignee of the present invention.

This application relates to co-pending U.S. patent application Ser. No. 09/198,007, filed on Nov. 24, 1998, entitled "Computer System and Method for Accessing a Computer-Readable Medium", naming Alan Beelitz as inventor. The co-pending application is incorporated herein by reference in its entirety, and is assigned to the assignee of the present invention.

This application relates to co-pending U.S. patent application Ser. No. 09/198,731, filed on Nov. 24, 1998, entitled "Computer System and Method for Preparing a Computer-Readable Medium", naming Alan Beelitz as inventor. The co-pending application is incorporated herein by reference in its entirety, and is assigned to the assignee of the present invention.

This application relates to co-pending U.S. patent application Ser. No. 09/235,862, filed on Jan. 25, 1999, entitled "Recoverable Software Installation Process and Apparatus For Computer System", naming Alan Beelitz and Richard Amberg as inventors. The co-pending application is incorporated herein by reference in its entirety, and is assigned to the assignee of the present invention.

A present trend among some computer manufacturers is to provide a customer with a custom built computer system in which the customer has designated that certain components and capabilities are to be included in the system being ordered. It is therefore important to maximize efficiency at every step of the build-to-order process. That efficiency begins at the time the order is placed and processed, and continues throughout the assembly, testing and shipment of the custom-built unit.

During production of build-to-order computer systems, specific components for a computer are pulled from stock and taken to an assembly pod where those specific components are assembled in the computer chassis. Following assembly, the chassis is moved to a quick-test area where tests are conducted to quickly determine whether the correct components for that order are installed, and whether the components are operative.

Following the quick test procedure, assembled chassis are moved to a burn rack where the components are "burned in" and where operational errors may be detected. Many units are simultaneously tested on the burn racks and the tests may take a number of hours to complete. With many units in production waiting to be tested, it is important that the burn rack spaces available for testing are used efficiently. Therefore, it is important that the computers or devices under test (DUT) are tested in a manner which quickly and efficiently determines whether a DUT is satisfactorily operational and if not, which quickly and efficiently determines operational deficiencies so that the DUT may be removed from the burn rack to free up the occupied burn rack space for another DUT to be tested.

Due to the amount of time required when rebooting a system, especially with respect to servers, it is highly desirable to avoid reboots in the manufacturing process whenever possible. One area in which it has been possible to eliminate a reboot (in most cases) has been following a hard disk drive preparation. Because the disk preparation process involves partitioning and formatting of the hard disk drive(s), it was traditionally necessary to reboot the system being manufactured so that the operating system (e.g., DOS) could recognize the new disk layout and construct logical drives accordingly. With the introduction of a utility called Waffle, however, it became possible to either refresh the characteristics of an existing logical C: drive (the "refresh" function) or to create an entirely new logical C: drive (the "synthesis" function).

Although this approach has been extremely successful in eliminating reboots in most cases, it has a couple of limitations. One limitation is that only the logical C: drive is refreshed or synthesized; whereas, if the manufacturing process needs to access a logical D: drive, for example, (as may be necessary for LCM server installation), a reboot is still required. Another situation in which the current implementation requires a reboot is the case where the hard disk drive(s) originally contained no recognizable partitions and a block device driver (such as for a RAM drive) has been loaded. Note that drive letters are allocated by the DOS operating system in a first come first served manner. In this case where the hard disk drive(s) originally contain not recognizable partitions, the block device will have been assigned logical drive letter C: and Waffle cannot update the logical drive to reflect the hard disk layout without losing accessibility to the block device. A computer system reboot would be required.

The prior method used to solve the above mentioned problem involves the rebooting of the computer systems being manufactured, when logical drives other than the C: drive must be accessed or when a block device has already been mapped to the C: drive. This, however, is disadvantageously time consuming in a high volume computer manufacturing environment. Manufacturing efficiency and throughput are adversely affected.

SUMMARY

According to one embodiment, a computer system includes at least one processor and at least one computer-readable drive. The at least one computer-readable drive includes at least one partition. The computer system further includes manufacturing process code having instructions for causing the processor to build prescribed internal data structures necessary to support the at least one partition subsequent an initial preparation of the at least one computer-readable drive, further without requiring a system reboot to have access to the at least one computer-readable drive.

A technical advantage of the embodiments of the present disclosure is that a computer system reboot is avoided and all necessary hard disk partitions and block devices remain accessible, thus advantageously saving on manufacturing time and resources, and further producing a more efficient manufacturing process.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, in which:

FIG. 1 illustrates a block diagram of a computer system for implementing the embodiments of the present disclosure;

FIG. 2 illustrates an exemplary table of logical drive mappings and characteristics for a hard disk drive and block device for the computer system of FIG. 1; and FIG. 3 is a process flow diagram of the waffle everything function according to one embodiments of the present disclosure.

DETAILED DESCRIPTION OF THE PREFERRED EMBODIMENT

Referring briefly to FIG. 1, a system block diagram of a computer system 10 is shown having features thereof configured in accordance a customer configured computer system order as discussed herein. The computer system 10 includes a central processing unit (CPU) 12, input/output (I/O) devices, such as a display, a keyboard, a mouse, and associated controllers, collectively designated by a reference numeral 14, a hard disk drive 16, and other storage devices, such as a may include a floppy disk drive, CD-ROM drive, and the like, collectively designated by a reference numeral 18, various other subsystems, such as a network interface card (or NIC), collectively designated by a reference numeral 20, and a block device 22, such as a RAM drive, all interconnected via one or more buses, shown collectively in FIG. 1 as a bus 24. The RAM drive is a computer-readable block device. Computer system 10 may also include a computer with block devices but no hard disk drive, for example, such as a computer system having one or more diskette drives only. A diskette drive is also an example of a block device. Still further, the computer system may include no magnetic-media drives at all, but one which supports a RAM drive. During a built-to-order manufacture of computer system 10, manufacturing process code can be stored in system memory for execution by the processor, further for carrying out the embodiments of the present disclosure as discussed herein.

The present embodiments include a combination of a Waffle "refresh" and "synthesis" capabilities, together with a new "relocate" capability. In this context, "relocate" means to change the drive letter assigned to a block device by updating two sets of parameters, both previous and current. The combination shall be referred to herein as the "waffle everything" function. Essentially, the Waffle program analyzes the hard disk organization and block device complement and uses its abilities to refresh, synthesize, or relocate drive mappings such that upon completion, mappings for all logical drives are equivalent to those which would have been obtained by rebooting the computer system.

To achieve mappings for all logical drives equivalent to those which would have been obtained by rebooting the computer system, Waffle examines each hard disk drive in a prescribed order. Waffle furthermore examines a prescribed chain of extended partitions (if any) of a given hard disk drive to determine the number of logical drives to map to the hard disk drive partitions. Hard disk drive partitions are mapped according to the following sequence: first the active primary partition (if any) for each hard disk drive; then any partitions within extended partitions, and lastly, any inactive primary partitions. Existing logical drives must be checked to determine which ones (if any) correspond to block devices. After all necessary information has been obtained, Waffle then constructs a set of logical drive structures that reflect the number and characteristics of hard disk partitions and block devices. As a result, the mappings for all logical drives are thus made equivalent to those which would have been obtained by rebooting the computer system.

Upon a completion of the waffle everything function, logical drives can be accessed in a normal manner without need to reboot the computer system. Block devices such as RAM drives can be accessed as before, since the method used to locate these drives involves an examination of the drive structures that have been updated by Waffle. Deployment of the "waffle everything" capability will mean that reboots can be avoided after all disk preparation steps (or anything that alters drive mappings), thereby yielding a faster and more robust manufacturing process.

In further discussion thereof, the present waffle everything embodiment includes scanning all hard disk drives in the computer system, looking at the partitions on each respective hard disk drive, and then using the standard DOS scheme for mapping drive letters, assigns logical drive letters to the hard disk drive partitions. That is, the process first makes assignments of drive letters, beginning with "C:", to the active primary partition, if any, on each hard disk drive in the computer system. Hard drives are scanned in a prescribed BIOS order. Returning to the first hard disk drive, the process then looks through the extended partitions (if any), following the chain of logical drives which may be built therein. Drive letters are assigned sequentially as the process proceeds. Finally, the process again scans the drives in BIOS order and assigns drive letters to any inactive primary partitions. After all hard disk partitions have been mapped to logical drives, then any block devices, such as RAM drives, are assigned drive letters.

Any partition on a hard disk drive may then be accessed by the same drive letter that it would have had the computer system been booted up under DOS with similar partitions already in place. Any block devices, such as RAM drives, can also be accessed. In the later instance, the block devices would have an appropriate drive letter and be accessible, i.e., by reviewing internal data structures of the computer system, identifying each RAM drive, and setting prescribed environment variables to reflect the mapping of each RAM drive. This is possible since Waffle creates, refreshes, etc., the internal drive structures such that the drive mappings are correctly established for the given computer system without requiring a system reboot. In other words, all hard disk partitions and block devices are made accessible without requiring a system reboot. The logical drive letters provide a means for the computer operating system to identify a respective device. If the computer's operating system were not to recognize a given hard disk drive partition or block device, then the operating system would not build the appropriate data structures to support the given partition or block device.

The avoidance of rebooting the computer system whenever possible during the manufacturing process can be illustrated with the following example. Assume that a computer system includes a hard disk drive and manufacturing process code, wherein the manufacturing process codes resides on a diskette. If during the manufacturing process, it is required to reboot the computer after a hard disk drive preparation, such that the operating system can recognize the newly created hard disk drive partitions, associate logical drives to those partitions, and also map reasonable drive letters to any block devices, then some sort of hard disk drive and block device state must be maintained. When booting into the manufacturing process code, the manufacturing process code must know whether i) the boot is an initial boot into the manufacturing process code, that is, to go ahead and proceed with a hard disk preparation or ii) whether the boot is a boot after the hard disk preparation, in which case, the manufacturing process code needs to make note of that fact and continue onward with the manufacturing process. Thus, if the manufacturing process includes hard disk preparation, followed by a reboot, and picks up where the process left off, then some form of record and/or indication must be maintained as to where the manufacturing process stopped and where the process is to begin again after reboot. Such a process which includes the rebooting of the computer system subsequent to an initial disk preparation consumes valuable manufacturing time and resources, not to mention the added complexity to the manufacturing process for managing the same. Furthermore, if the exemplary manufacturing process is not managed correctly, the computer system being manufactured can be undesirably left in an indeterminate state, for example, upon an occurrence of an unexpected interruption in the manufacturing process. At that point, recovery might require beginning the entire manufacturing process over again, with a formatting and repartitioning of the hard disk drive. Similarly, an error might occur which falsely indicates that hard disk preparation is completed, when in reality the hard disk preparation is incomplete. In such an instance, corrupt data would be perpetuated throughout the manufacturing process of the computer system, leading to catastrophic results.

The operating system of the computer operates in terms of the disk drive and block devices with drive letters having specific attributes. For example, a diskette drive can be mapped as the A: or B: drive. The C: drive is always mapped to the first active primary partition of the hard disk drive. At most, only one active primary partition is allowed per hard disk drive, further according to a particular BIOS enumeration scheme. Drive letters can further be assigned to extended partitions and inactive primary partitions (inactive primary partitions do not gain control upon a reboot of the computer system).

Mapping of partitions will depend upon a number of hard disk drives in a system as determined by BIOS, sizes of each hard disk drive, and the type of file system installed (e.g., FAT16, FAT32, NTFS). For example, if a computer system includes an 8 GByte hard disk drive and the file system is FAT16, then the hard disk drive will be mapped as four logical drives C:, D:, E:, and F:. Note the a FAT16 partition can not be larger than 2 GBytes. In contrast, if the hard disk drive were an 8 GByte drive and a FAT32 file system were used, then since FAT32 allows up to 8 GBytes per partition, the entire hard drive can be mapped as a logical C: drive.

Turning briefly to FIG. 2, an exemplary organization of the hard disk drive and block devices of the computer system is shown. The characteristics of the hard disk drive may include two primary partitions (p), one of which is marked as an active primary partition and the other of which is marked as an inactive primary partition. The primary partitions are further assigned the logical C: drive and the logical D: drive, respectively. In this example, the computer system further includes a block device, such as a RAM disk. The block device is assigned the logical E: drive, as shown in FIG. 2. Additional logical drive assignments and device characteristics are possible, i.e., according to the particulars of a given computer system.

Referring now to FIG. 3, the waffle everything process shall now be discussed further with respect to the flow diagram, beginning at step 50. In step 52, an examination of the hard disk drives and block devices in the computer system is tabulated. In particular, the partitioning and formatting of all hard disk drives in the computer system are examined as discussed herein above. In addition, all block devices known to the operating system are examined. For instance, it may be determined that the organization of the hard disk drive and block devices of the computer system include that as shown in FIG. 2. In step 54, an inquiry is made as to whether or not any change is required to be made. Depending upon the results of step 52, if the characteristics, sizes, and mappings obtained during the examination of the hard disk drives and block devices match those which are already known to the operating system, then no change is needed and the process is completed or ends at step 56. In step 54, if a change is required, then the process continues at step 58. In step 58, any needed logical drive structures which are not found in the computer system are synthesized, for example, using a Waffle synthesize function. The process proceeds to step 60 which includes updating any logical drive structures, if necessary, using a Waffle refresh function. Continuing with step 62, any logical drives which are no longer required or needed are deleted. The process then ends at step 56.

While the method and apparatus of the present disclosure have been particularly shown and described with reference to the various embodiments thereof, it will be understood by those skilled in the art that various changes in form and detail may be made therein without departing from the spirit and scope of the method and apparatus, as set forth in the following claims.

What is claimed is:

1. A computer system comprising:
   a processor;
   a first computer-readable drive;
   a second computer-readable drive;
   manufacturing process code executable by the processor for causing the computer system to:
      detect a first logical drive assigned to the first computer-readable drive;
      detect a partition on the second computer-readable drive;
      reassign the first logical drive to the partition; and
      assign a second logical drive to the first computer-readable drive; and
   an operating system executable by the processor for causing the computer system to access the first computer-readable drive using the second logical drive and access the second computer-readable drive using the first logical drive prior to rebooting the computer system.

2. The system of claim 1, wherein the first computer-readable drive includes a block device.

3. The system of claim 2, wherein the second computer-readable drive includes a hard disk drive.

4. The system of claim 3, wherein the first logical drive is a C: drive, and wherein the second logical drive is a D: drive.

5. A method for mapping logical drives in a computer system comprising:
   detecting a first logical drive assigned to a first computer-readable drive;
   detecting a partition on a second computer-readable drive;
   reassigning the first logical drive to the partition;
   assigning a second logical drive to the first computer-readable drive; and
   prior to rebooting the computer system:
      accessing the first computer-readable drive using the second logical drive; and
      accessing the second computer-readable drive using the first logical drive.

6. The method of claim 5, wherein the first computer-readable drive includes a block device.

7. The method of claim 6, wherein the second computer-readable drive includes a hard disk drive.

8. The method of claim 7, wherein the first logical drive is a C: drive, and wherein the second logical drive is a D: drive.

* * * * *